United States Patent [19]

Day et al.

[11] Patent Number: 5,350,717
[45] Date of Patent: Sep. 27, 1994

[54] METHOD FOR TREATING BETA-SPODUMENE CERAMICS

[75] Inventors: J. Paul Day; David L. Hickman, both of Big Flats, N.Y.

[73] Assignee: Corning Incorporated, Corning, N.Y.

[21] Appl. No.: 72,547

[22] Filed: Jun. 4, 1993

[51] Int. Cl.$^5$ .................. C03C 10/12; C04B 35/18
[52] U.S. Cl. ................................. 501/7; 501/128
[58] Field of Search .................. 501/7, 128; 427/399

[56] References Cited

U.S. PATENT DOCUMENTS 3,843,981  9/1974  Grossman et al. .
4,011,091  3/1977  McCollister .

OTHER PUBLICATIONS

Russian Journal of Inorganic Chemistry, vol. 7, No. 2, pp. 126–129, (Feb. 1962).
Transactions of the ASEM, Journal of Engineering for Power, Paper No. 78-JT-118, pp. 1–5, Gas Turbine Conference, London, England (Apr. 9–13, 1978).

*Primary Examiner*—Karl Group
*Attorney, Agent, or Firm*—Kees van der Sterre

[57] ABSTRACT

A vapor-phase method for treating a beta-spodumene ceramic article to achieve a substitution of exchangeable hydrogen ions for the lithium present in the beta-spodumene crystals, wherein a barrier between the ceramic article and the source of exchangeable hydrogen ions is maintained in order to prevent lithium contamination of the hydrogen ion source and to generate highly recoverable lithium salts, is provided.

5 Claims, No Drawings

METHOD FOR TREATING BETA-SPODUMENE CERAMICS

The Government of the United States of America has rights in this invention pursuant to Contract No. DEN-3-336 awarded by the Department of Energy.

BACKGROUND OF THE INVENTION

The present invention relates to a method for treating beta-spodumene ceramic articles, and more particularly to a method for treating such ceramic articles with acid in the vapor phase to extract and recover lithium from the ceramics.

The treatment of beta-spodumene ceramics to extract lithium therefrom is well known. Thus, Y. I. Ostroushko et al. disclose, in the *Russian Journal Of Inorganic Chemistry*, Volume 7, Number 2, pages 126–129 (February, 1962), that lithium can be extracted from mineral beta-spodumene by a hydrogen ion exchange with a strong aqueous acid such as sulfuric acid.

Also known is the fact that a hydrogen-for-lithium ion exchange reaction can proceed in the vapor phase. Thus J. P. Day et al, in "A Study of Chemical Reactivity in Ceramic Heat Exchangers", *Transactions of the ASME, Journal of Engineering for Power*, Paper No. 78-JT-118, pages 1–5, Gas Turbine Conference, London, England (Apr. 9–13, 1978), describe a test procedure for screening beta-spodumene ceramics wherein exposure of the ceramics to an acid atmosphere in a gradient furnace resulted in an extraction of lithium from the beta-spodumene phase even at sample locations where condensation of the acid from the atmosphere did not occur.

In commercial practice, as shown by U.S. Pat. No. 3,843,981, the treatment of beta-spodumene ceramics to produce lithium free aluminous keatite ceramics involves the leaching of the lithium from the ceramic in a strong acid bath. Modification of these procedures have been developed, for example in U.S. Pat. No. 4,011,091 wherein exposure to the vapors of a refluxing strong acid is also used to modify the properties of the product.

A significant and long-standing problem associated with all of these prior procedures relates to the problem of the reversibility of the lithium ion exchange reaction, i.e., the fact that the presence of significant concentrations of lithium in the leaching medium slows or halts the ion exchange reaction. Thus it has long been the commercial practice to use a large excess of acid over lithium in the leaching solution in order to obtain complete extraction.

This points up a significant economic problem with the commercial process, which is that of reprocessing the volume of spent lithium-containing sulfuric acid leaching medium which is generated by the process. Thus acid which would otherwise be of sufficient strength to continue effective leaching has to be taken out of service because it contains excessive lithium concentrations. And, the commercial value of the lithium and the sulfuric acid present in the spent medium is considerably reduced because of the need for separation processing.

It is therefore a principal object of the present invention to provide a method for treating beta-spodumene ceramic articles which can effectively remove the lithium from the ceramic while avoiding the problems of leachant contamination found in the prior art commercial process.

Other objects and advantages of the invention will become apparent from the following description thereof.

SUMMARY OF THE INVENTION

The present invention employs a modified vapor phase ion exchange procedure to provide a practical process for the treatment of beta-spodumene ceramics, and which permits the economical recovery of lithium after separation thereof from the ceramic. In a typical embodiment, the process involves positioning the ceramic article in proximity to an acid vapor source such as a refluxing solution of strong acid while maintaining the temperature of the article, and the vapors, at a substantially uniform temperature above that at which condensation of the acid vapors on the ceramic will occur.

In this environment it is found that a rapid extraction of the lithium from the ceramic article proceeds through the development of a lithium salt accumulation or bloom on the surface of the ceramic. Moreover, and without significantly interfering with the exchange reaction, a salt barrier can be interposed between the ceramic and the source of acid vapors which can prevent contamination of the acid by the lithium salt.

This approach yields two distinct advantages. First, the lithium salt can be easily recovered from the surface of the ceramic article, either periodically in the course of treatment or at the conclusion thereof. This salt is highly concentrated, having relatively low acid content and little or no included water.

In addition, in the case of a liquid solution acid source, the acid present in the solution remains substantially free of lithium, and the acid content can thus be completely utilized without any need to recycle or reprocess for the purpose of concentrating or purifying the acid.

In a first aspect, then, the invention includes a method for treating a beta-spodumene ceramic article using acid vapors only. That method includes the steps of, first, providing a source of strong acid vapors and positioning the article at a location spaced away from the source but accessible to the vapors. The article is then contacted with the vapors, while the vapors are circulating about the entire article, and while both the entire article and the vapors are maintained at a substantially uniform temperature above the condensation temperature of the vapors.

Contact between the article and the vapors is continued under these conditions for a time at least sufficient to form a lithium salt deposit or bloom on the surface of the article. This is most typically until a predetermined proportion of the lithium, such as substantially all of the lithium, is extracted from the article. Thereafter, the lithium salt is recovered from the surface of the article, with this recovery being accomplished without contaminating the vapor source with the salt.

In its preferred embodiments, the method of the invention will involve a procedure wherein the source of strong acid vapor is a refluxing container of liquid acid. The ceramic article being treated will be positioned proximate to the container, e.g., at a location above the refluxing acid bath, and both the article and the vapors in contact therewith will be maintained at a temperature above the condensation temperature of vapors.

In this type of procedure the ceramic article will be separated from the container by a salt barrier, such as a plate, tray, or other containment vessel, which barrier will be effective to prevent lithium contamination of the liquid acid. To assure uniform contact between the vapors and the entire surface of the article being treated, vapor circulation means effective to direct a flow of vapors over the article will be provided. In this way, cracking of the article due to uneven extraction of lithium therefrom can be avoided.

DETAILED DESCRIPTION

For purposes of the present description and invention, beta-spodumene ceramics are considered to include ceramics or glass-ceramics wherein crystals of beta-spodumene or beta-spodumene solid solution constitute the principal crystal phase in the article, making up 85% or more by weight of the composition. As is well known, whereas beta-spodumene crystals may have a base crystal stoichiometry of about $Li_2O.Al_2O_3.4SiO_2$, they readily enter into solid solution with silica in stoichiometries ranging up to $Li_2O.Al_2O_3.8SiO_2$, or even higher. In general, however, beta-spodumene ceramics of industrial importance will have compositions comprising, in weight percent, about 2-7% $Li_2O$, 12-30% $Al_2O_3$, and 60-85% $SiO_2$, with other oxides in the form of crystalline compounds or glassy phases making up not more than about 15% by weight of the ceramic.

Ceramic articles treatable in accordance with the invention may thus comprise essentially any of the beta-spodumene ceramic materials leachable with strong acids in accordance with prior art practice for exchange of lithium from these ceramics. Such ceramics include conventional powder-formed and sintered beta-spodumene articles provided by conventional ceramic slip-casting, extrusion, or the like followed by sintering or, more desirably, beta-spodumene glass-ceramic articles formed by the sintering and subsequent crystallization of powdered lithium aluminosilicate glasses.

The use of crystallizable glasses of this type facilitates the construction of ceramic bodies such as ceramic honeycomb bodies of very fine and uniform cell configuration as well as highly crystalline microstructure. Such honeycomb bodies can be formed by the extrusion of plastic batch compositions containing powdered lithium aluminosilicate glasses in combination with suitable vehicle components. Alternatively, they can be formed from slips of the glass powder which are incorporated into paper carrier sheets and laid up into a honeycomb structure by wrapping, or from slips or other suspensions applied to other supporting structures such as ceramic foam supports.

Although various sources of acid vapor can be used in the practice of the invention, the preferred vapor sources are strong mineral acids such as sulfuric acid, nitric acid or the like. Aqueous mineral acids offer a process control advantage in that the boiling temperature of the acids depends on acid concentration. Further, containers of such acid maintained at the boiling point can generate sufficient acid vapors to provide rapid lithium extraction from sintered beta-spodumene ceramics even where condensation of the acid on the ceramic is limited or avoided.

As previously suggested, a suitable position for the ceramic is a position immediately above a refluxing acid bath. However, due to the presence of water vapor in the reaction environment in this type of process, it is desirable that the ceramic article and the vapors in the immediate vicinity of the article be maintained at a temperature above vapor condensation temperature of the vapors. This assures that only minimal formation of liquid phase aqueous acid on the surface of the ceramic will occur, and thereby simplifies the task of maintaining complete separation between the acid vapor source and the lithium salt forming on the treated article.

A suitable barrier between the ceramic being treated and the refluxing container of liquid acid in a refluxing liquid environment such as described is a metal tray, composed for example of gray iron or, more preferably, stainless steel. Such a tray can readily be designed to perform the dual purpose of mounting the ceramic article at a suitable location above the refluxing acid and containing any lithium salt formed on the surface of the ceramic being treated which might inadvertently be dislodged from the ceramic article in the course of treatment.

In general, some uniformity of vapor access or contact between the acid vapors and the ceramic structure in the course of vapor treatment is important in avoiding the possibility of cracking of the ceramic due to uneven lithium extraction and hydrogen substitution. To achieve such uniformity, means for circulating the acid vapors around the ceramic in the treating chamber will generally be provided.

The nature of the means selected for circulating the acid vapors is not critical, but could comprise, for example, fans, baffles, blowers, vapor directing tubes or the like for sweeping the surfaces of the ceramic article with the acid vapors.

The use of relatively efficient and properly directed vapor flows is particularly important where the ceramic article consists of a ceramic honeycomb body. Hence, ceramic honeycombs, especially when of high cell density and thin wall structure, are more prone to cracking than flat plate bodies, and also offer some resistance to simple convective vapor flow through the cells when the cells are small. On the other hand, if a uniform circulation of the acid vapors around and through the ceramic article being treated is provided, an even extraction of lithium from the structure can be achieved and cracking of the pieces will generally be avoidable.

The removal of lithium salts extracted from the ceramic article and formed as a deposit on the article surface can most effectively be achieved by mechanical means. Examples of suitable techniques for this purpose include vibration or shaking and vacuuming or air blasting. Mechanical removal is preferred over washing for the bulk of the recovery process since the handling of acidic lithium salt solutions can thereby be avoided. However, washing of the ion-exchanged ceramic will generally be required as a final step in the process in order to eliminate the possibility that a back-exchange of lithium for the hydrogen in the treated structure will occur in later use.

The particularly preferred strong acid source of vapors for ion exchange with beta-spodumene ceramics is sulfuric acid. Hence, while other strong mineral acids such as nitric acid, hydrochloric acid or the like, or mixtures of any of these acids, could alternatively be used, sulfuric acid comprises perhaps the most effective extraction medium for beta-spodumene ceramics, is economical to employ, provides a lithium salt (lithium sulphate) which has significant commercial value. The concentration of acid in the liquid acid medium used for refluxing is not critical, although it is useful to utilize concentrated acid solutions in order to reduce the need for acid additions to the liquid and increase the refluxing temperature of the acid and thus the vapor temperature at the surface of the ceramic article being treated.

The duration of the vapor ion-exchange treatments applied selected ceramics in accordance with the invention will be selected depending upon the configuration and crystalline microstructure of the article and the level of lithium removal required. In general, however, for thin-wall, highly crystalline ceramics with little or no intergranular glassy phases, treatments will not ordinarily be less than about an hour or more than about 24 hours.

As an illustrative example, removal of substantially all of the lithium from a beta-spodumene ceramic article of thin-walled honeycomb structure (with a wall thickness of about 0.13 mm) can be achieved through treatments of 24 hours duration, with efficient vapor circulation at acid refluxing temperatures of 200°–300° C. Of course, much longer treatments may have to be used for articles of large cross-section or where substantial intergranular glass is present.

The invention may be further understood by reference to the following working example thereof, which is intended to be illustrative rather than limiting.

EXAMPLE

A ceramic honeycomb body formed of Corning code 9455 beta-spodumene ceramic material, commercially available from Corning Incorporated, Corning, N.Y., is selected for treatment. This ceramic honeycomb, having cell walls approximately 0.13 mm in thickness, is set on a tray which is placed on a rack in an electrically heated treatment chamber.

The ceramic piece is elevated above the surface of the tray utilizing small pieces of alumina, these supports insuring that vapor circulation throughout the cell structure of the honeycomb is adequate to achieve substantially uniform contact and reaction with acid vapors present in the treatment chamber. Placed in the chamber beneath the tray supporting the honeycomb ceramic is a container of aqueous sulfuric acid (78% $H_2SO_4$ by weight), having a boiling temperature of about 200° C.

After the ceramic and acid have been positioned as described, the chamber is closed, the temperature of the acid is raised to the boiling point, and the temperature of the furnace atmosphere is raised to about 300° C. These conditions are maintained with the ceramic honeycomb in position over the refluxing acid bath for an interval of approximately 24 hours. At the conclusion of the vapor treatment the ceramic article and tray are removed from the ion exchange chamber and examined.

Upon examination of the ceramic honeycomb it is found that a thick, relatively dry coating of lithium sulfate has formed on the external and inner channel wall surfaces of the honeycomb. This salt accumulation is effectively removed by simple vibration of the piece, followed by a brief cleaning of the interior cell walls with a stream of compressed air. The surface of the ceramic is thus rendered substantially free of the salt, but with final rinsing of the honeycomb with water. Small amounts of the salt on the tray are also recovered. No indication of any salt contamination of the sulfuric acid bath is seen.

The product of this treatment is an integral ceramic honeycomb body wherein substantially complete replacement of the lithium aluminosilicate beta-spodumene crystallites has been replaced by hydrogen. The article thus provided can be heated treated, if desired, to remove water from the crystalline structure in accordance with conventional practice.

While the invention has been particularly described above with respect to specific examples of compositions, materials, apparatus and/or procedures, it will be recognized that such examples are presented for purposes of illustration only and are not intended to be limiting. Thus numerous modifications and variations upon the compositions, materials, processes and apparatus specifically described herein may be resorted to by those skilled in the art within the scope of the appended claims.

We claim:

1. A method for treating a beta-spodumene ceramic article which comprises the steps of:
   providing a source of strong acid vapor;
   positioning the article at a location spaced from the source;
   contacting the article with circulating vapors of a strong acid while maintaining the article and the vapor at a substantially uniform temperature above the condensation temperature of the vapor, said contact being for a time at least sufficient to form a lithium salt bloom on the surface of the article; and
   recovering the salt from the surface of the article without contaminating the source with the salt.

2. A method in accordance with claim 1 wherein the source of strong acid vapor is a refluxing container of aqueous mineral acid, wherein the ceramic article is maintained at a temperature above the condensation temperature of the strong acid vapor, and wherein the ceramic is separated from the container by a salt barrier effective to prevent contamination of the liquid acid.

3. A method in accordance with claim 2 wherein the strong acid vapor comprises sulfuric acid vapor.

4. A method in accordance with claim 3 wherein the ceramic is provided in the form of a ceramic honeycomb.

5. In the method for treating a beta-spodumene ceramic article wherein the ceramic is contacted with vapors of a refluxing strong acid to extract lithium salt therefrom, the improvement wherein:
   the ceramic article is maintained at a substantially uniform temperature above the condensation temperature of the acid vapors; and
   a salt barrier is interposed between the ceramic and the strong acid, whereby contamination of the strong acid with lithium salt is prevented.

* * * * *